(12) United States Patent
Sallee et al.

(10) Patent No.: US 10,134,064 B2
(45) Date of Patent: Nov. 20, 2018

(54) LIGHTING AUDIT AND LED LAMP RETROFIT

(71) Applicant: LEDVANCE LLC, Wilmington, MA (US)

(72) Inventors: Matthew Sallee, Denver, CO (US); Anthony W. Catalano, Boulder, CO (US)

( * ) Notice: Subject to any disclaimer, the term of this patent is extended or adjusted under 35 U.S.C. 154(b) by 655 days.

(21) Appl. No.: 14/738,187

(22) Filed: Jun. 12, 2015

(65) Prior Publication Data
US 2015/0379594 A1    Dec. 31, 2015

Related U.S. Application Data

(60) Provisional application No. 62/018,068, filed on Jun. 27, 2014.

(51) Int. Cl.
| | |
|---|---|
| *G06Q 30/02* | (2012.01) |
| *G06Q 30/06* | (2012.01) |
| *G06K 9/00* | (2006.01) |
| *G06K 9/46* | (2006.01) |
| *H04N 5/232* | (2006.01) |

(52) U.S. Cl.
CPC ..... *G06Q 30/0283* (2013.01); *G06K 9/00691* (2013.01); *G06K 9/4661* (2013.01); *G06Q 30/0643* (2013.01); *H04N 5/23229* (2013.01)

(58) Field of Classification Search
CPC ......... H05B 41/3922; G06T 7/50; G06T 7/60; G06T 7/90; G06T 7/586; G06T 7/70; G06T 7/73; H04N 5/23229; H04N 5/2357; G01B 11/24–11/25; G06K 9/4604; G06K 9/52; G06K 9/6202; G06K 9/00; G06K 9/00624; G06K 9/00664; G06K 9/00684; G06K 9/00691–9/00704; G06Q 30/0283; G06Q 30/0643; F21K 9/10; F21K 9/23–9/278
See application file for complete search history.

(56) References Cited

U.S. PATENT DOCUMENTS

| | | | | |
|---|---|---|---|---|
| 7,697,062 | B2 * | 4/2010 | Wernersson | H04N 5/2354 348/224.1 |
| 8,417,385 | B2 * | 4/2013 | Chen | G05B 15/02 700/275 |
| 8,923,622 | B2 * | 12/2014 | O'Haire | G06K 9/3216 382/154 |
| 8,994,814 | B2 * | 3/2015 | Ganick | G01C 21/206 340/13.24 |
| 9,041,731 | B2 * | 5/2015 | Aliakseyeu | G06F 3/011 345/619 |
| 9,613,433 | B2 * | 4/2017 | Nolan | G06T 7/90 |
| 9,639,773 | B2 * | 5/2017 | Lalonde | G06K 9/4661 |
| 9,885,775 | B2 * | 2/2018 | Holtman | G01S 5/163 |
| 9,900,471 | B2 * | 2/2018 | Chen | H04N 1/60 |
| 2008/0180553 | A1 * | 7/2008 | Hassan-Shafique | G01J 1/32 348/234 |
| 2009/0015588 | A1 * | 1/2009 | Nagayama | G06T 15/50 345/426 |
| 2011/0320013 | A1 * | 12/2011 | Chen | G05B 15/02 700/12 |

(Continued)

*Primary Examiner* — Michael Osinski

(57) ABSTRACT

Embodiments of the invention provide systems and techniques for analyzing an existing light fixture in its installed environment and, based on the sensed location of the light and its environmental illumination pattern, identifying at least one LED retrofit fixture that may be used to replace the existing light fixture.

11 Claims, 6 Drawing Sheets

(56) References Cited

U.S. PATENT DOCUMENTS

| | | | | |
|---|---|---|---|---|
| 2012/0057755 A1* | 3/2012 | Berkvens | H05B 37/0227 | 382/103 |
| 2013/0028475 A1* | 1/2013 | Ganick | G01C 21/206 | 382/103 |
| 2013/0058577 A1* | 3/2013 | Stubler | G06K 9/6218 | 382/195 |
| 2013/0058583 A1* | 3/2013 | Gallagher | G06F 17/30247 | 382/224 |
| 2013/0169814 A1* | 7/2013 | Liu | H04N 7/183 | 348/151 |
| 2013/0214698 A1* | 8/2013 | Aliakseyeu | G06F 3/011 | 315/292 |
| 2013/0300899 A1* | 11/2013 | Tamura | H04N 5/2351 | 348/234 |
| 2014/0093126 A1* | 4/2014 | Roberts | G06K 9/00691 | 382/103 |
| 2014/0161358 A1* | 6/2014 | O'Haire | G06K 9/3216 | 382/199 |
| 2015/0042843 A1* | 2/2015 | Ikizyan | H04N 5/23229 | 348/223.1 |
| 2015/0178592 A1* | 6/2015 | Ratcliff | H04N 5/23222 | 382/155 |
| 2015/0243084 A1* | 8/2015 | Kanemaru | G06T 19/006 | 345/426 |
| 2016/0027190 A1* | 1/2016 | Minagawa | G06T 5/001 | 382/167 |
| 2016/0042531 A1* | 2/2016 | Nolan | H05B 37/036 | 348/135 |
| 2016/0148363 A1* | 5/2016 | Phan | G06T 7/001 | 348/142 |
| 2016/0154088 A1* | 6/2016 | Holtman | G01S 5/16 | 382/106 |
| 2016/0210754 A1* | 7/2016 | Ida | G06T 7/0073 | |
| 2016/0284075 A1* | 9/2016 | Phan | G06T 7/001 | |
| 2017/0011522 A1* | 1/2017 | Rajagopalan | G01B 11/002 | |
| 2017/0156430 A1* | 6/2017 | Karavaev | A41H 1/02 | |
| 2017/0205061 A1* | 7/2017 | Broers | F21V 21/15 | |
| 2017/0244876 A1* | 8/2017 | Ida | G06K 9/52 | |

* cited by examiner

FIG. 4

LIGHTING AUDIT AND LED LAMP RETROFIT

CROSS-REFERENCE TO RELATED APPLICATIONS

This application claims priority to and the benefit of U.S. Provisional Patent Application No. 62/018,068, filed on Jun. 27, 2014, the entire disclosure of which is hereby incorporated herein by reference.

FIELD OF THE INVENTION

The present invention relates, generally, to retrofitting of conventional lighting with energy-efficient alternatives. More specifically, various embodiments relate to the acquisition of lighting parameters of an existing installation and identifying suitable replacements.

BACKGROUND

Lighting elements that use one or more light-emitting diodes ("LEDs"), referred to herein generally as LED lamps, are increasingly used to replace fixtures that use older technology, such as incandescent-, fluorescent-, or halogen-based lighting elements (or older, less-efficient LED technology). LED lamps may have a higher up-front cost than these alternatives, but generally consume less energy to operate and last longer, thereby providing a savings in cost of use over time.

The purchase and installation of LED lamps may present a number of challenges and concerns, however. Cost is one; a prospective purchaser of LED lamps may base the purchase decision not only on the up-front cost of acquisition and installation, but also on the number of weeks or years of LED operation that must elapse before that cost is recouped. Another challenge may be identifying the proper LED lamps to best match the lighting characteristics provided by existing lighting elements such that, after installation of the new LED lamps, the luminosity, color temperature, etc., in a given space remains substantially unchanged. A purchaser may, in addition, wish to improve on (and not simply maintain) a given space's lighting characteristics via installation of the LED lamps. These variables may affect each other, further complicating the selection process; a purchaser may, for example, tolerate a higher up-front cost and a longer cost-recoupment time in exchange for more desirable lighting characteristics. Another concern is that a sale may depend on the ability to provide this information to a prospective purchaser in real time during a site visit. A need therefore exists for a way to provide a rapid assessment of existing lighting conditions and recommendations for retrofit LED lamps based thereon.

SUMMARY

Embodiments of the invention provide systems and techniques for analyzing an existing light fixture in its installed environment and, based on the sensed location of the light and its environmental illumination pattern, identifying at least one LED retrofit fixture that may be used to replace the existing light fixture. In some embodiments, a simulation of the retrofit fixture illuminating the surrounding environment is generated.

In various embodiments of the present invention, the tablet is used to gather information regarding one or more installed lighting fixtures, determine appropriate retrofit LED candidates, and compute a projected amount of cost savings over time (using, for example, an "internal rate of return" analysis). Each of these steps may be carried out in a variety of different ways, all of which are within the scope of the present invention.

Accordingly, in a first aspect, the invention pertains to a portable electronic device for auditing existing lighting fixtures and identifying replacement retrofit lighting fixtures therefor. In various embodiments the system comprises, in a single housing, an orientation sensor; a camera comprising an image sensor; means for accessing a database of information comprising characteristics of the existing and retrofit lighting fixtures; and a computer processor configured to execute instructions for (i) analyzing an image obtained by the image sensor to locate a light source therein and detect a light pattern therearound; (ii) identify, from the light pattern, at least one lighting parameter associated with the light source; (iii) obtaining, from the orientation sensor, an orientation of the housing with respect to the light source when the image was obtained; (iv) based on the orientation, assigning the light source to a lighting category; and (v) based on the lighting parameter(s) and the lighting category, retrieving, from the database, data specifying at least one retrofit fixture for replacing the light source. The portable electronic device may comprise or consist of a tablet PC, smartphone, or laptop computer.

In various embodiments, the system further comprises a network interface. The database may be local to the portable electronic device or remotely accessible to the portable electronic device via the network interface. In various embodiments, the system comprises a display screen, wherein (i) the image includes the light source and a surrounding environment, and (ii) the processor is further configured to generate and cause display, on the display screen, of a simulation image of the selected retrofit fixture illuminating the surrounding environment in the image. The processor may be further configured to compute and cause display, on the display screen, of a projected amount of cost savings over time for use of the at least one retrofit fixture.

In another aspect the invention also pertains to a portable electronic device for auditing existing lighting fixtures and identifying replacement retrofit lighting fixtures therefor. In various embodiments, the system comprises, in a single housing a camera comprising an image sensor; means for accessing a database of information comprising characteristics of the existing and retrofit lighting fixtures; and a computer processor configured to execute instructions for (i) analyzing an image obtained by the image sensor to locate a light source therein and detect a light pattern therearound, the image including and an environment surrounding the light source; (ii) identifying, from the light pattern, at least one lighting parameter associated with the light source; (iii) based on the at least one lighting parameter and the lighting category, retrieving, from the database, data specifying at least one retrofit fixture for replacing the light source; and (iv) generating and causing display, on the display screen, of a simulation image of the selected retrofit fixture illuminating the surrounding environment in the image. Once again, the portable electronic device may be a tablet PC, smartphone, or laptop computer; may include a network interface; and the database may be local and/or remote.

In still another aspect, the invention pertains to a system for auditing existing lighting fixtures and computing a cost savings of retrofit lighting fixtures. In various embodiments, the system comprises a database of information comprising characteristics of the existing and retrofit lighting fixtures; and a portable electronic device comprising a computer processor for executing instructions for (i) gathering information regarding existing lighting fixture types and numbers, (ii) determining retrofit fixture types and numbers based on the gathered information and based on information in the database, and (iii) calculating a projected amount of cost savings over time for use of the retrofit fixtures as compared to use of the existing lighting fixtures.

Once again, the portable electronic device may be a tablet PC, smartphone, or laptop computer; may include a network interface; and the database may be local and/or remote. The system may also include a digital camera and/or an orientation sensor disposed therein or thereon for gathering at least some of the information. The processor may be configured to compute and cause display, on the display screen, a projected amount of cost savings over time for use of the at least one retrofit fixture.

The term "substantially" or "approximately" means±10% (e.g., by weight or by volume), and in some embodiments, ±5%. The term "consists essentially of" means excluding other materials that contribute to function, unless otherwise defined herein. Nonetheless, such other materials may be present, collectively or individually, in trace amounts. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

The foregoing will be more readily understood from the following detailed description of the invention, in particular, when taken in conjunction with the drawings, in which:

FIGS. 3-6 illustrate representative output screens.

DETAILED DESCRIPTION

Figure 1:
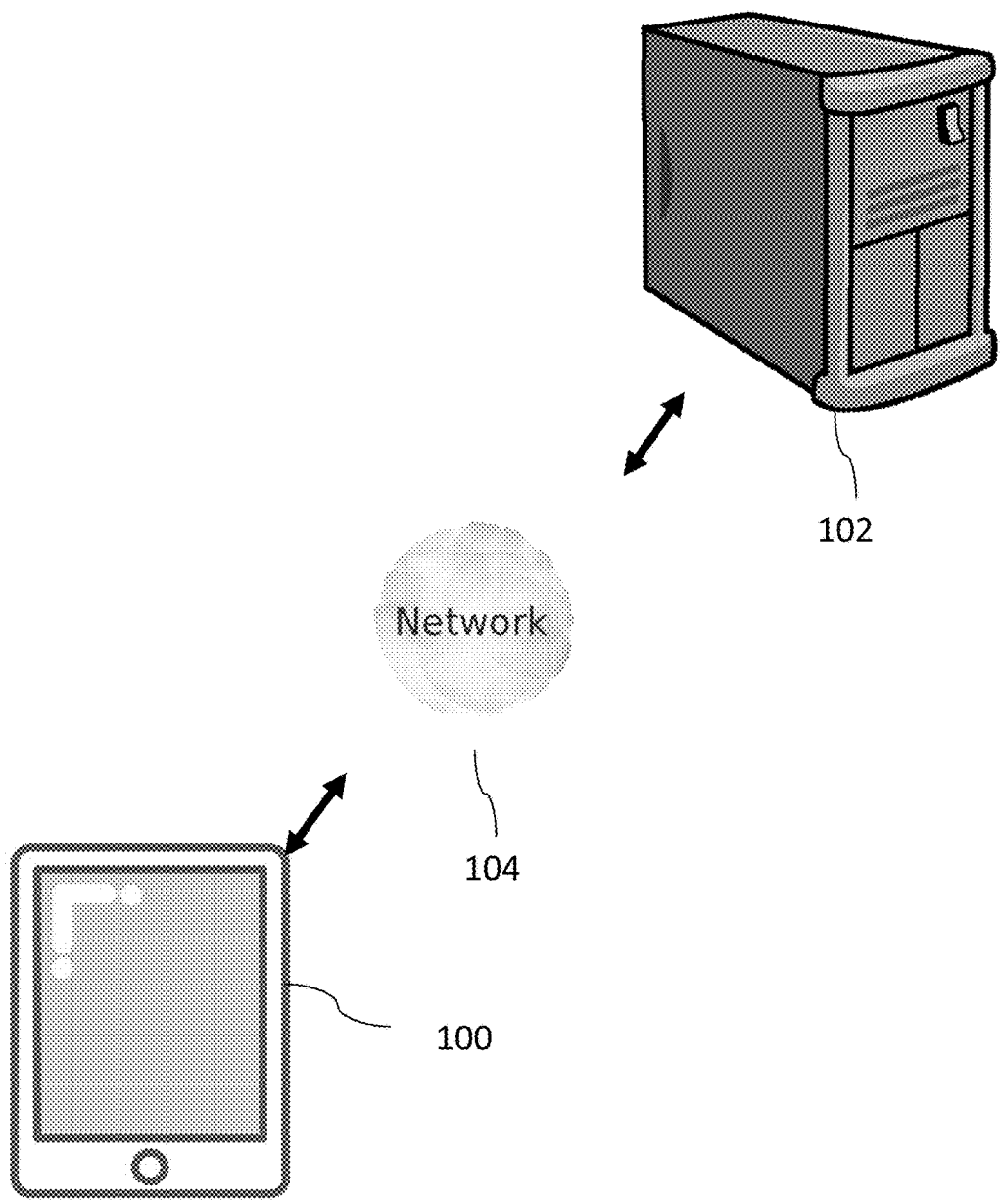
FIG. 1 conceptually illustrates the operation of embodiments of the present invention.

Described herein are various embodiments of methods and systems for auditing existing lighting conditions by examining the light output of the existing lighting elements themselves, and proposing retrofit replacements. FIG. 1 illustrates a tablet PC 100 upon which, as explained in greater detail below, various embodiments of the present invention may execute. The tablet PC 100 may be, for example, an APPLE IPAD, a SAMSUNG GALAXY, a WINDOWS tablet, or any other type of tablet PC; the present invention is not limited to any particular style or model. The tablet PC 100 may execute any operating system, such as APPLE IOS or GOOGLE ANDROID. In other embodiments, other computing devices may be used in place of the tablet PC 100, such as "smartphones" (i.e., wireless communication devices capable of running applications and communicating via the public telecommunications infrastructure and/or the Internet) or laptop computers.

The tablet PC 100 may optionally connect to a remote server 102, such as a data server, application server, or similar device via a network 104, such as the Internet and/or the wireless telecommunications infrastructure.

Figure 2:
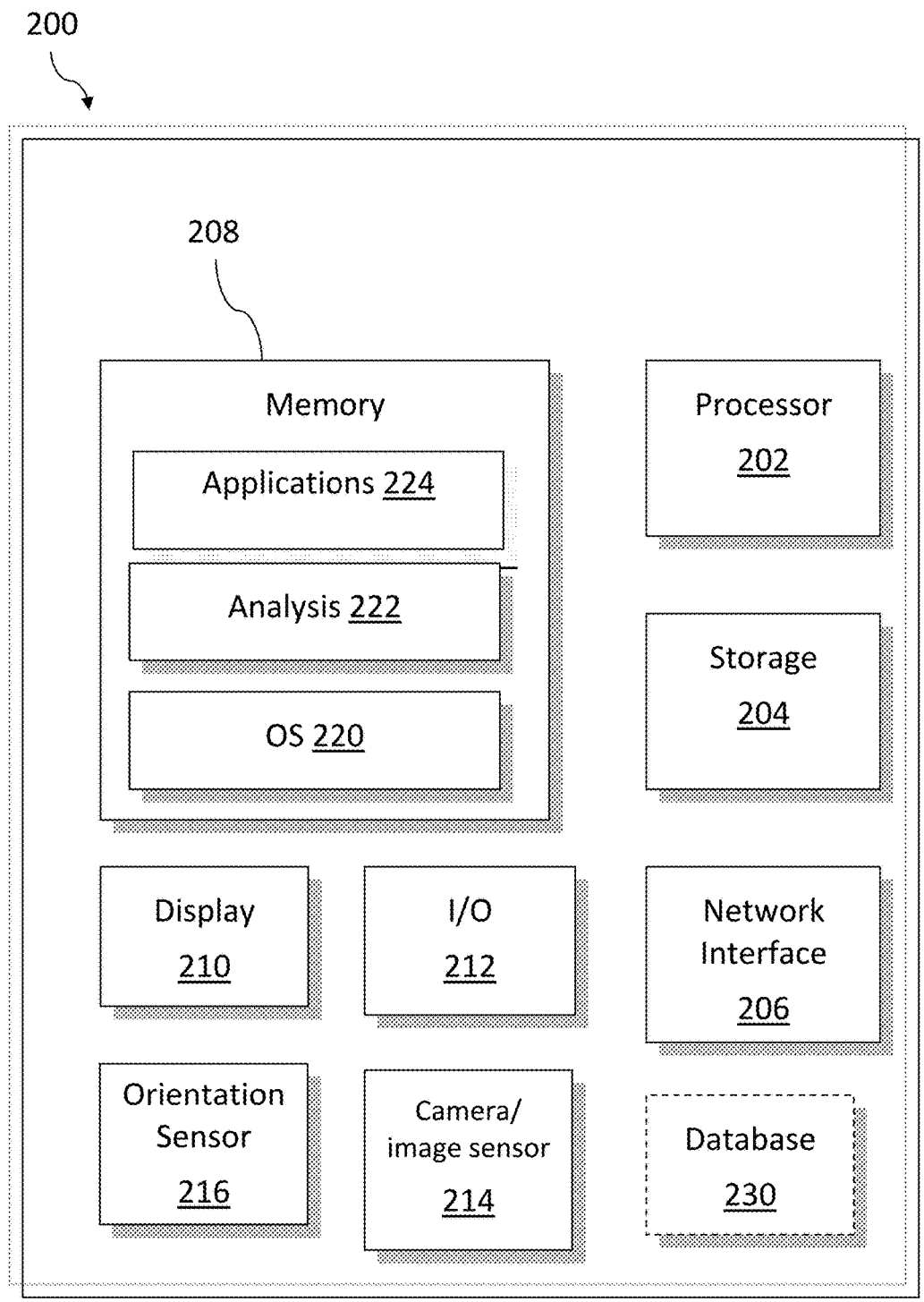
FIG. 2 illustrates the components of a representative hardware implementation.

FIG. 2 is a block diagram of an exemplary tablet PC, indicated at 200. The tablet PC 200 may include a processor 202 (such as an ARM or INTEL processor), storage 204 (such as a disk drive or flash memory), a network interface 206 (supporting wireless protocols such as WI-FI or ETHERNET, and/or a cellphone link), a memory 208 (such as RAM), a display 210 (e.g., a touch screen), input/output devices 212 (such as a keyboard, a touchscreen interface, and/or voice interface), a camera 214 including an image sensor (e.g., a CCD or CMOS sensor that converts sensed light into a pixel array stored in the memory 208), and an orientation sensor 216 (e.g., three differently oriented accelerometers).

The memory 208 may include instructions for an operating system 220, an analysis module 222 and applications 224 that execute as running processes on the tablet 200; these instructions may be executed by the processor 202. One or more of the applications 224 may relate to the embodiments of the invention discussed below. A user may launch an application 224 by, for example, selecting an icon on the display 210 via touch or mouse click. In addition, the tablet 200 includes a database 230 of lighting data as more fully described below. The database 230 may be resident locally on the tablet 200 (e.g., in the storage 204), or may be remote and accessed by the processor 202 via the network interface 206 (e.g., it may reside on the server 102). In some embodiments, at least a portion of the database 230 is stored locally and periodically updated from a server 102 via the network interface 206. In general, the database 230 contains records corresponding to conventional and retrofit light fixtures and specifying information such as model names, lighting characteristics, and images of the fixtures, and/or images of the lighting patterns they produce.

I. Gathering Information Regarding Installed Lighting Fixture Types and Numbers

In one embodiment, a user of the tablet 200 enters a manufacturer, model name or number, or other identifying features relating to installed lighting fixtures observed by the user. The user (e.g., a lighting sales representative) may, for example, recognize the size, shape, color, or other physical attributes of fixtures installed at a site and/or may inspect the features to determine the model name or number. An application 224 may present the user with a list, menu, drop-down selector, or similar interface for selecting and inputting the model name or number; the list may be hierarchical, allowing the user to first select general categories of fixtures and then presenting narrower lists based on the general selection. The application 224 may instead or in addition present a search entry box, allowing the user to type or otherwise input the model name or number (or other identifying information) related to observed fixtures and thereafter present the user with results of the search.

In another embodiment, the user may take one or more digital photographs or digital video frames of an installed fixture using the camera 214. Multiple photographs may be taken of a single fixture from different angles or distances, and the fixture may be illuminated in some photographs but not others. Once taken, the photographs may be analyzed by the analysis module 222 to determine the presence and location of one or more fixtures therein. The analysis module 222 may use any of various conventional and readily available algorithms—e.g., edge detection or pattern matching—to locate a fixture in the image. Using the located image as a registration guide, the unilluminated image may be subtracted from the illuminated image to isolate the light pattern produced by the legacy fixture. Further processing (e.g., contrast enhancement) may be applied to better isolate the pattern. The size of the pattern may be estimated based on the distance to the legacy fixture, which may itself be readily estimated using, for example, conventional programming based on the image size (e.g., the EASYMEASURE application marketed by Caramba App Development), and the brightness may be estimated by comparison against the unilluminated image. The light pattern may be analyzed to determine additional characteristics thereof, such as spectrum, color temperature, etc. It may also be desirable to estimate the overall amount of light produced by the photographed fixture(s), which may be accomplished by averaging pixel brightness values over the entire image, with an unilluminated photograph of the same environment (or portion thereof, such as a wall) used as a baseline. This value, in turn, may be used to estimate the light output of the fixture(s) in the photograph.

Most simply, any fixtures detected in a photograph may be compared against a database of pictures of known fixtures and, if a match is found (e.g., an exact match or a match within an acceptable margin of error), information regarding the matching fixture or fixture category may be retrieved from the database 230 to the application 224. Thus, the database 230 contains entries (i.e., records or tuples) corresponding to conventional fixtures with fields containing data facilitating the matching process (e.g., a compressed representation of the light pattern (or a pointer thereto), light output, brightness, spectrum, and/or color temperature). The data fields may also include data relating to maintenance, e.g., the per-lamp and per-ballast costs, the number of lamp and ballast replacements expected in an average year, and the labor rate and expected labor time for replacement.

The match may further be based on the appearance of the fixture as well as the pattern of its light output. The light may be captured directly from the fixture or indirectly by, for example, taking a picture of a wall, floor, ceiling, or other surface or object illuminated by the fixture. These determined characteristics may be compared to corresponding characteristics stored in the database 230, and again, if a sufficiently close match is found, the installed fixture is assumed to be the associated type or model. The reference light pattern of a legacy fixture may be obtained from the fixture manufacturers or may instead be obtained by estimation (based on the fixture configuration and rated light output) or actual observation in the manner described above.

The orientation sensed by the orientation sensor 216 when the image is recorded by the camera 214 may be used to identify the type or category of an installed fixture. For example, if a fixture is captured in a photograph taken while the camera lens is oriented such that its field of view is generally upward (i.e., at an inclination angle greater than horizontal), the fixture in the image may be deemed to be a ceiling fixture. Similarly, if the camera is pointed generally downward, the fixture in the image may be deemed to be a floor-mounted or ground-effect fixture, and if the inclination angle is approximately horizontal, the fixture may be deemed to be a wall sconce.

More than one of the fixture-determination methods described above—direct user input, image matching, light analysis, and orientation analysis—may be employed simultaneously. The orientation analysis, for example, may be used to reduce the number of candidate fixtures to only overhead or only wall-mount lighting, and then the analysis module 222 need only search the database 230 for a match within one of those groups of fixtures. Similarly, if a model of a fixture cannot be precisely determined by direct comparison of light patterns and/or light parameters, the application 224 may present the user with a list of candidate matches and asked to select the appropriate model.

The computer processing described above may occur on the tablet PC 200, via the analysis module 222; on the server 102; or a combination thereof. The division depends on factors such as the computational and memory capacity of the tablet 200, the size of the database 230 and the frequency with which it is updated, and the capacity of the server 102. For example, less computationally intensive processing, such as searching for an entered model name in a database of text, may be performed locally, while more computationally intensive processing, such as image searching, may be performed remotely. For example, the user of the tablet PC 200 may take one or more photographs of a fixture, optionally perform simple image-editing tasks such as cropping, and then upload the images to the server 102 for analysis and searching. The server 102 may thereafter send any results back to the tablet PC 200. In some embodiments or for some analyses, a category of light fixture may be sufficient, in which case database lookup may not be necessary.

The preceding discussion described identifying fixture types; the application 224 may further determine the number of installed fixtures. In one embodiment, the user may enter the number of fixtures manually. In other embodiments, the user may take a photograph of a plurality of installed fixtures and the application 224 may count them automatically (by, for example, analyzing the captured images for light sources therein as discussed above), and may analyze each different fixture separately for matching purposes.

The number of installed fixtures may be extrapolated from a given sample of installed fixtures (whether manually entered or determined automatically). For example, if the total area of a given site is known or estimated, and a number of fixtures in a portion of the area is determined, the ratio of fixtures to area for the area portion may be applied to the total area to estimate the total number of fixtures. In one embodiment, the user takes a photograph of a plurality of fixtures and the application 224 determines the distance between the fixtures by, for example, identifying fixtures in the image, analyzing the perspective of the image, and estimating the distance between the camera and the fixtures. Visual cues in the image, such as ceiling tiles, wall patterns, ceiling/wall intersections, etc., may be used to help determine the perspective and/or distances in accordance with well-known, conventional image-analysis techniques. The determined fixture-to-fixture distances in the image may be used to extrapolate a total number of fixtures at the site.

II. Determining Appropriate Retrofit LED Fixture Candidates

Once the number and type of installed fixtures have been determined or estimated, the application 224 may select one or more retrofit LED fixture candidates by querying the database 230. In one embodiment, the database 230 contains entries for retrofit fixtures with fields similar to those in the existing-fixture entries—e.g., a compressed representation of the light pattern (or a pointer thereto), light output, brightness, spectrum, and/or color temperature. In addition, the retrofit entries may contain cost and maintenance data both to facilitate selection of an optimal retrofit fixture and to assist the user with a purchase decision as described below. Cost data may also be used by the application 224 to compute a net economic benefit to retrofitting and/or to match, as closely as possible, a target cost savings.

In general, retrofit fixtures are selected to match, as closely as possible, the characteristics of the light output by the existing fixtures as described above. In other embodiments, the retrofit fixtures may be instead selected to improve the existing light characteristics; such improvements may include greater or lesser light output, changes in luminosity (e.g., warmer or cooler light), or similar features, e.g., to bring the installation into compliance with an interior lighting standard or policy.

The number of retrofit fixtures may be selected to match the number of installed fixtures, in which case a one-for-one replacement would not require, for example, the installation of additional lighting sockets. In other embodiments, the number of retrofit fixtures may be greater or fewer than the number of installed fixtures. Fewer retrofit fixtures may provide a total cost savings, even if the cost per fixture is greater than it would be for a one-to-one replacement. A greater number of retrofit fixtures may also provide a total cost savings, even taking into account the additional installation costs, if a lower operating cost per fixture can be achieved (because, for example, each fixture need output less light and/or last longer than a conventional light source).

The determined lighting characteristics of the installed fixtures may vary over the area of the site. This variance may be intentional and desirable; for example, some areas of the site, such as manufacturing areas, may require brighter light, while people in other areas, such as office areas, may prefer dimmer light. The number and type of retrofit fixtures may be selected to mimic this existing variance. In other embodiments, the existing variance may be unintentional and undesirable; the number and type of retrofit fixtures may thus be selected to remove or reduce this variance.

III. Computing a Projected Amount of Cost Savings Over Time

Once the type and number of installed fixtures have been determined or estimated, and once the type and number of retrofit fixtures have been determined, a cost savings over time may be computed. As mentioned above, the retrofit fixtures require less electrical energy to operate and last longer than the existing features, thus reducing the cost of operation relative thereto. This cost savings may be applied, over time, against the up-front cost of installation to inform a potential customer as to the length of time required to recoup the up-front cost (and inform the customer as to additional future savings in excess of the recoupment).

The below equations may be used to calculate an annual energy cost of installed, existing fixtures. The present invention is not limited to only these equations, however, and any method of computing energy cost (and the other factors described further below) are within the scope of the present invention. Some variables, such as lamps per fixture, lamp wattage, number of fixtures, and ballast factor (which is a number between 0 and 1 indicating an amount of energy lost to the operation of a ballast, i.e., circuitry that supplies the operating voltage and regulates current) are determined by the application 224, by the user of the application, or by referencing information associated with determined fixtures. Other variables, such as electrical rate, may be determined via other means (such as by querying a database of a local electrical provider).

Existing Watts per Fixture=Existing Lamps per Fixture×Existing Lamp Wattage+(1−Ballast Factor)×(Existing Lamps per Fixture×Existing Lamp Wattage)

Existing Watts=Existing Number of Fixtures×Existing Watts per Fixture

Existing KWH=Existing Watts×Runtime Hours/1000

Existing Annual Energy Cost=Existing KWH×Electrical Rate

The below equations may be used to compute a retrofit annual energy cost, given a determined number and type of retrofit fixtures.

Retrofit Watts=Retrofit Number of Fixtures×Retrofit Watts per Fixture

Retrofit KWH=Retrofit Watts×Runtime Hours/1000

Retrofit Annual Energy Cost=Retrofit KWH×Electrical Rate

The below equations may be used to compute an annual cost savings after installation of the retrofit fixtures.

Retrofit Up-Front Cost=Retrofit Unit Price×Retrofit Number of Units

Watts Reduced=Existing Watts−Retrofit Watts

KWH Reduced=Existing KWH−Retrofit KWH

KWH Percent Savings=KWH Reduced/Existing KWH

Annual Cost Savings=Existing Annual Energy Cost−Retrofit Annual Energy Cost

The below equations may be used to estimate maintenance costs for the existing fixtures, maintenance costs for the retrofit fixtures, and/or the difference between the costs. These maintenance costs may or may not be included in the final internal rate of return.

Number of Lamps Replaced Annually=Number of Lamps per Year×Number of Lamps per Fixture×Number of Fixtures Number of Ballasts Replaced Annually=Number of Ballasts per Year×Number of Fixtures Maintenance Material Cost=(Number of Lamps Replaced Annually×Lamp Cost)+(Number of Ballasts Replaced Annually×Ballast Cost)

Maintenance Labor Cost=(Labor Hourly Rate×Maintenance Hours per Fixture)×(Number of Lamps Replaced Annually+Number of Ballasts Replaced Annually)

Finally, the internal rate of return (IRR) may be computed using the below equation, which represents the factors involved; one of skill in the art will understand how to compute the precise internal rate of return for one or more years using, for example, the IRR function in MICROSOFT EXCEL.

Internal Rate of Return=Percent of ((−Retrofit Up-Front Cost)+Annual Cost Savings(time))

IV. Report Generation

Any or all of the above information may be presented in the form of a report suitable for viewing by a potential customer. The report may include, for example, the proposed type and number of installed fixtures and/or retrofit fixtures to be installed, a summary of projected cost savings, and details of the projected cost savings. The report may further include additional information, such as the address and photographs of the site and sales contact information. The report may be provided on the display 210 and/or delivered as a hard or soft copy (such as, for example, an ADOBE PDF). In various embodiments, additional information may be sourced and incorporated into the report. For example, position information, such as GPS coordinates or latitude/longitude, may be used to index a climatological database and air conditioning savings may be computed using data therein.

Figure 3:
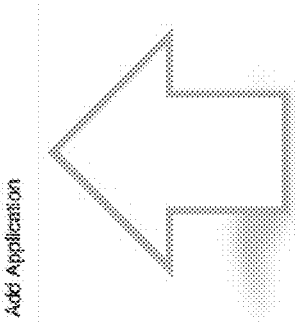
Figure 4:
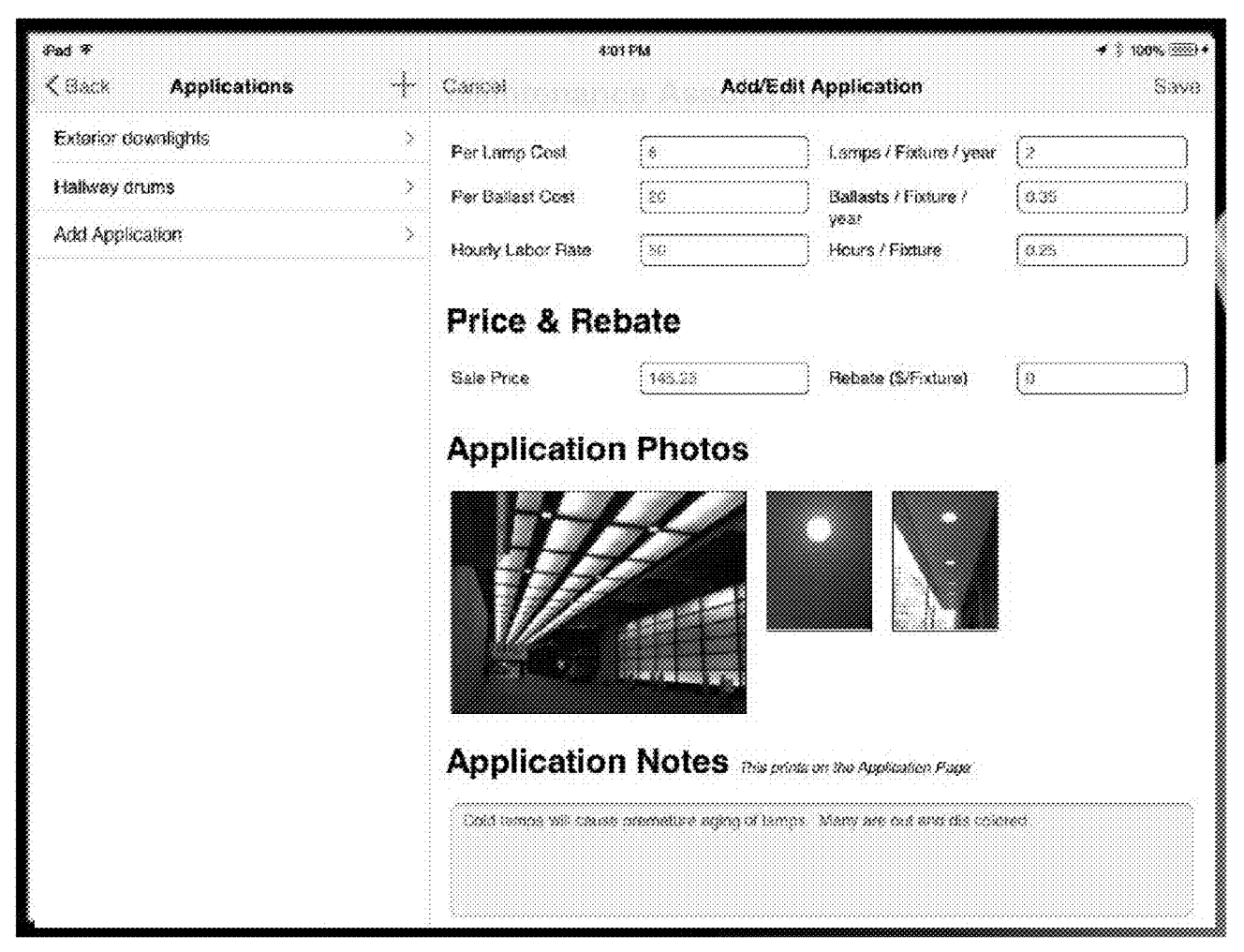

FIGS. 3-6 illustrate exemplary screenshots generated by the application 224 running on the tablet 200. These screenshots are not intended to be limiting, and represent only one embodiment of the present invention. FIGS. 3 and 4 are two parts of a single page (which is too large for the display screen 210, and is therefore viewed on the tablet 200 in its entirety by scrolling) facilitating entry of information regarding existing and retrofit lighting, as well as maintenance assumptions. The depicted fields may be populated manually or automatically, as described above. For example, the sales associate or customer may enter information specifying existing lighting fixtures, or these may be inferred by the application 224 based on database lookup (which may itself be based on the image obtained by the camera 214 and the orientation of the tablet 200 when the image was recorded, as described above). The recommended retrofit is obtained as described above, i.e., by database lookup and best matching. Maintenance assumptions and price/rebate terms may also be included in the database entries for the existing and/or retrofit fixtures, or may be entered manually.

Figure 5:
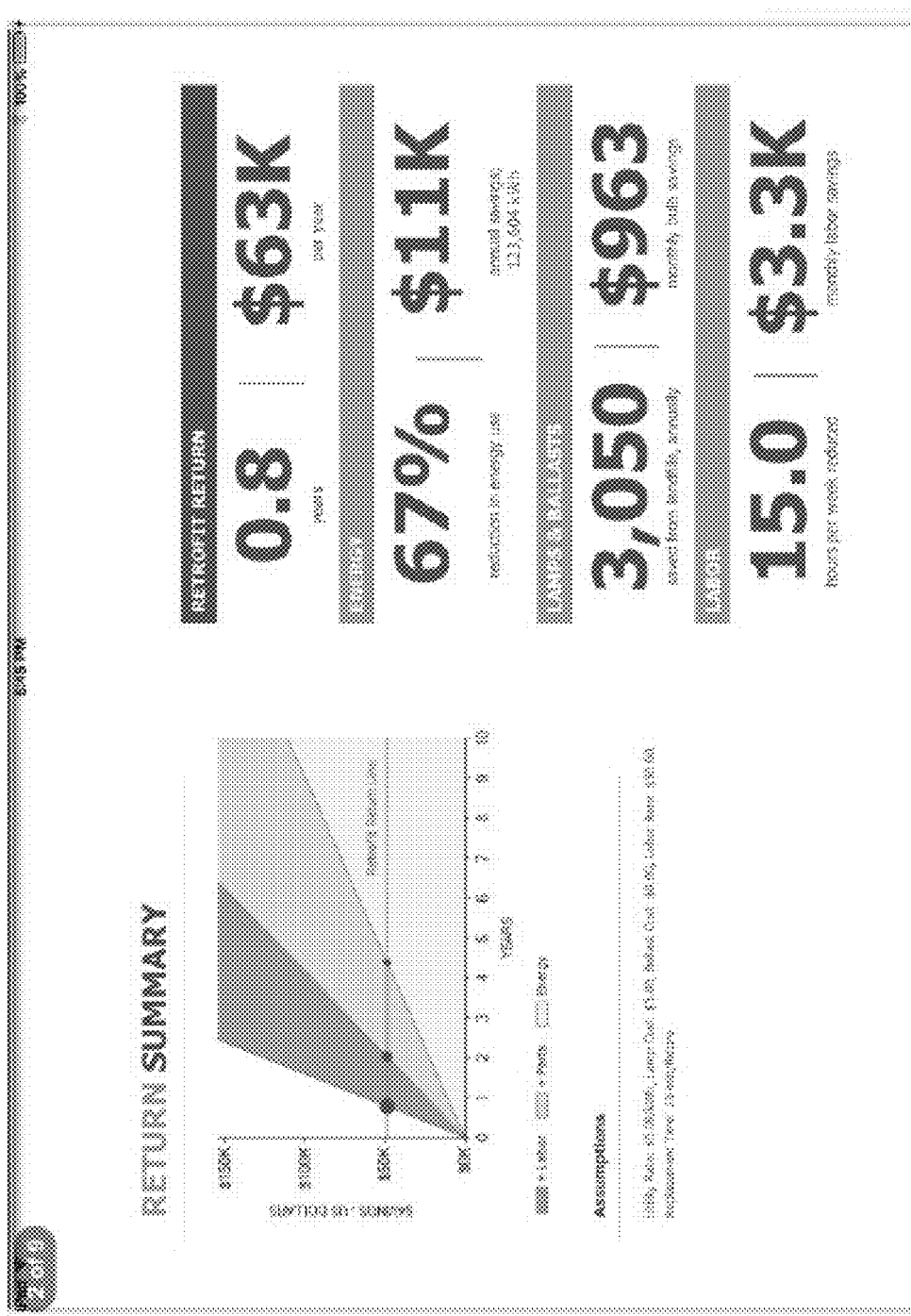
Figure 6:
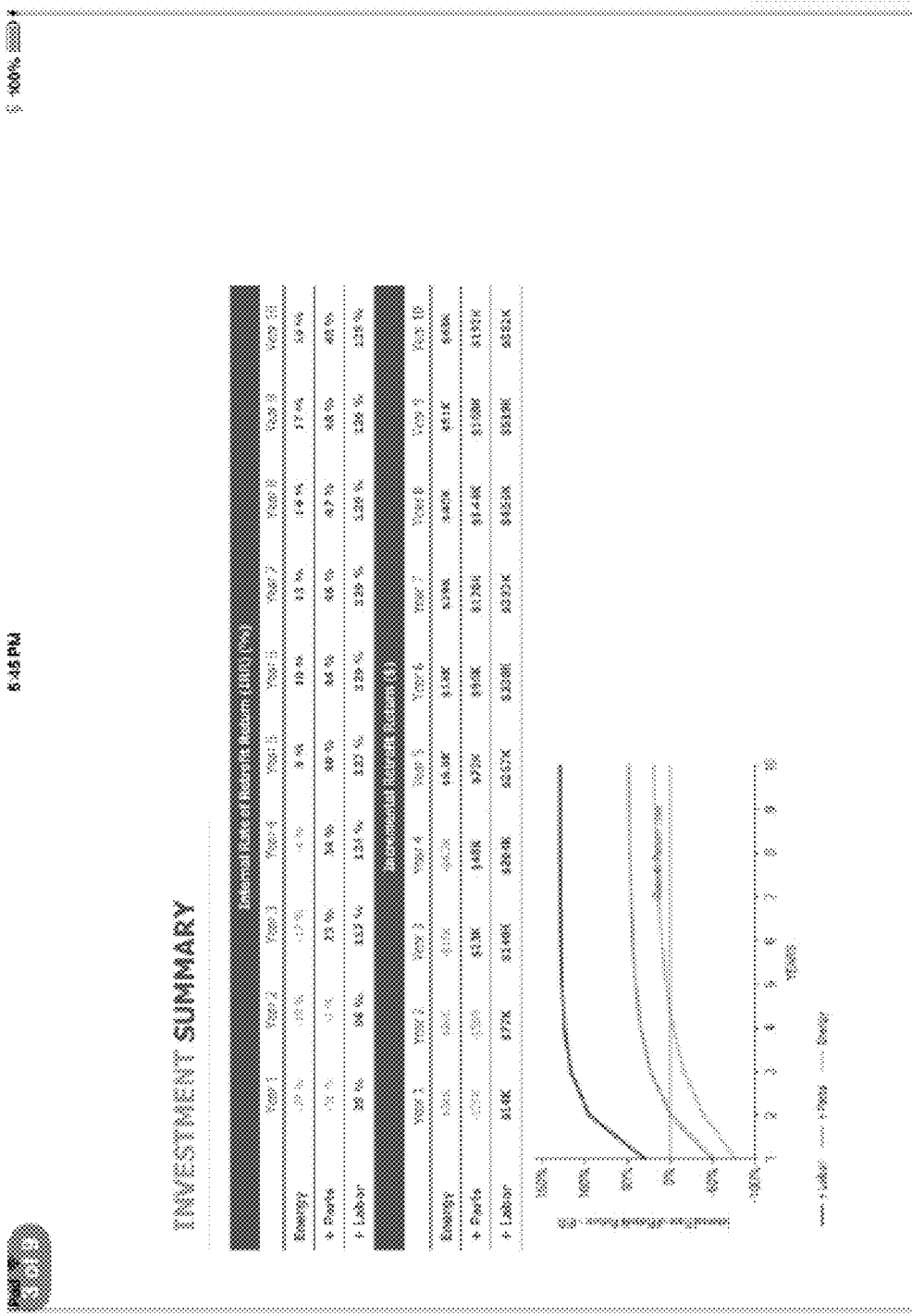

The application 224 uses computations such as those described above to provide economic projections relevant to the purchase decision such as those shown in FIGS. 5 and 6. The cost-savings summary in FIG. 5 and the details in FIG. 6 provide cost savings projections over the long and short term. For example, in the illustrated example, the "retrofit return" entry shows that a positive return is achieved in less than a year and that the long-term IRR is $63,000/year. Savings are further broken down and attributed to energy, parts and labor. In FIG. 6, the summary data of FIG. 5 is broken out on a projected year-by-year basis.

V. Lighting Simulation

The application 224 may be configured to generate a simulation of the the proposed retrofit lighting in the target environment. This may be accomplished as follows. As explained above, the application 224 analyzes an image to locate a fixture therein and to isolate an illumination pattern of the detected fixture(s). The application 224 may replace the pixels corresponding to the detected fixture with new pixels representing the proposed retrofit fixture. Furthermore, the database entries for retrofit fixtures may contain or point to representations of their output lighting patterns. Pixels corresponding to the lighting pattern of the existing fixture are identified and replaced with pixels representing the lighting pattern of the retrofit fixture. Further image processing to correct for size, perspective and camera orientation (as sensed by the orientation sensor 216) is straightforwardly applied—for example, the lighting patterns may be scalable vectorized representations—with the result that the image of the existing installation is "morphed" into an estimated image of the proposed retrofit. Thus, the "application photos" field in FIG. 4 may start out with photos taken at the site and be replaced, as the customer watches, with the estimated images integrating the proposed retrofit fixtures into the actual, photographed environment.

It should also be noted that embodiments of the present invention, including, in particular, the application 224, may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A portable electronic device for auditing existing lighting fixtures and identifying replacement retrofit lighting fixtures therefor, the system comprising, in a single housing:
    an orientation sensor;
    a camera comprising an image sensor that acquires an illuminated image and an unilluminated image;
    means for accessing a database of information comprising characteristics of the existing and retrofit lighting fixtures; and
    a computer processor configured to execute instructions for:
        (i) measuring differences between an illuminated image obtained by the image sensor when a light source is in an on state to an unilluminated image obtained by the image sensor when the light source is in an off state, to locate the light source therein and detect a light pattern therearound;
        (ii) identifying, from the light pattern, at least one lighting parameter associated with the light source;
        (iii) obtaining, from the orientation sensor, an orientation of the housing with respect to the light source when the image was obtained;
        (iv) based on the orientation, assigning the light source to a lighting category; and
        (v) based on the at least one lighting parameter and the lighting category, retrieving, from the database, data specifying at least one retrofit fixture for replacing the light source.

2. The system of claim 1, wherein the portable electronic device is a tablet PC, a smartphone, or a laptop computer.

3. The system of claim 2, further comprising a network interface, wherein the database is local to the portable electronic device or remotely accessible to the portable electronic device via the network interface.

4. The system of claim 1, further comprising a display screen, wherein (i) the image includes the light source and a surrounding environment, and (ii) the processor is further configured to generate and cause display, on the display screen, of a simulation image of the selected retrofit fixture illuminating the surrounding environment in the image.

5. The system of claim 1, wherein the processor is further configured to compute and cause display, on a display screen of the portable electronic device, of a projected amount of cost savings over time for use of the at least one retrofit fixture.

6. A system for auditing existing lighting fixtures and computing a cost savings of retrofit lighting fixtures, the system comprising:
   a database of information comprising characteristics of the existing and retrofit lighting fixtures; and
   a portable electronic device comprising:
      an orientation sensor;
      a camera comprising an image sensor that acquires an illuminated image and an unilluminated image;
      a computer processor for executing instructions for:
         (i) measuring differences between an illuminated image obtained by the image sensor when a light source is in an on state to an unilluminated image obtained by the image sensor when the light source is in an off state, to locate the light source therein and detect a light pattern therearound;
         (ii) identifying, from the light pattern, at least one lighting parameter associated with the light source;
         (iii) obtaining, from the orientation sensor, an orientation of the housing with respect to the light source when the image was obtained;
         (iv) based on the orientation, assigning the light source to a lighting category; and
         (v) based on the at least one lighting parameter and the lighting category, retrieving, from the database, data specifying at least one retrofit fixture for replacing the light source.

7. The system of claim 6, wherein the portable electronic device is a tablet PC, a smartphone, or a laptop computer.

8. The system of claim 6, wherein the database is local to the portable electronic device or remotely accessible to the portable electronic device via a network.

9. The system of claim 6, wherein the processor is configured to compute and cause display, on a display screen of the portable electronic device, of a projected amount of cost savings over time for use of the at least one retrofit fixture.

10. The system of claim 1, wherein when the orientation of the housing is directed upwards, then limiting candidate light fixtures to overhead fixtures.

11. The system of claim 10, wherein when the orientation of the housing is horizontal, then limiting candidate light fixtures to wall-mount lighting fixtures.

\* \* \* \* \*